(12) United States Patent
Kim et al.

(10) Patent No.: US 7,805,661 B2
(45) Date of Patent: Sep. 28, 2010

(54) METHOD OF FORMATTING AND ENCODING UPLINK SHORT LENGTH DATA IN A WIRELESS COMMUNICATION SYSTEM

(75) Inventors: Bong Hoe Kim, Ansan-si (KR); Joon Kui Ahn, Seoul (KR); Hak Seong Kim, Seoul (KR); Dong-Wook Roh, Seoul (KR); Dong Youn Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 1367 days.

(21) Appl. No.: 11/229,179

(22) Filed: Sep. 15, 2005

(65) Prior Publication Data

US 2006/0062217 A1 Mar. 23, 2006

(30) Foreign Application Priority Data

Sep. 15, 2004 (KR) .................. 10-2004-0073834

(51) Int. Cl.
*H03M 13/00* (2006.01)
(52) U.S. Cl. .................. 714/776; 714/790; 714/758
(58) Field of Classification Search .................. 714/776, 714/790, 774, 800, 746, 758, 788
See application file for complete search history.

(56) References Cited

U.S. PATENT DOCUMENTS

| | | | | |
|---|---|---|---|---|
| 4,559,625 A | * | 12/1985 | Berlekamp et al. | 714/701 |
| 5,416,787 A | * | 5/1995 | Kodama et al. | 714/790 |
| 5,623,485 A | * | 4/1997 | Bi | 370/209 |
| 5,729,557 A | * | 3/1998 | Gardner et al. | 714/774 |
| 5,838,266 A | * | 11/1998 | Houle et al. | 341/51 |
| 6,304,196 B1 | * | 10/2001 | Copeland et al. | 341/58 |
| 6,990,622 B2 | * | 1/2006 | Davis et al. | 714/763 |
| 2003/0147422 A1 | | 8/2003 | You et al. | |
| 2004/0010743 A1 | | 1/2004 | Lee et al. | |
| 2005/0235195 A1 | * | 10/2005 | Choi et al. | 714/800 |

FOREIGN PATENT DOCUMENTS

| | | |
|---|---|---|
| CN | 1356795 | 7/2002 |
| CN | 1378395 | 11/2002 |

\* cited by examiner

*Primary Examiner*—Fritz Alphonse
(74) *Attorney, Agent, or Firm*—Lee, Hong, Degerman, Kang & Waimey

(57) ABSTRACT

A method of encoding and transmitting at least one short length data in a wireless communication system is provided. More specifically, a user equipment (UE) attaches at least one error detection code to the at least one short length data. Thereafter, the UE encodes for error correction the short length data and the attached error detection code using at least one block encoder. Here the short length data and the attached error detection code are independently encoded. Lastly, the UE transmits the encoded short length data and the encoded error detection code.

22 Claims, 4 Drawing Sheets

METHOD OF FORMATTING AND ENCODING UPLINK SHORT LENGTH DATA IN A WIRELESS COMMUNICATION SYSTEM

This application claims the benefit of Korean Application No. 10-2004-0073834, filed on Sep. 15, 2004, which is hereby incorporated by reference.

BACKGROUND OF THE INVENTION

1. Field of the Invention

The present invention relates to a method of formatting and encoding, and more particularly, to a method of formatting and encoding uplink control information in a wireless communication system.

2. Discussion of the Related Art

With the growing demand for transmission of data in an uplink direction, various methods of transmitting data using a high speed transmission channel are being discussed. In particular, an Enhanced Uplink Dedicated Channel (E-DCH) is a prime example of such high speed transmission channel in a $3^{rd}$ Generation Partnership Project (3GPP) wireless mobile communication system.

Compared to the existing Dedicated Channel (DCH), the new E-DCH boasts, among other functions, a Hybrid Automatic ReQuest (HARQ). In HARQ, a base station (Node B) receives a data packet transmitted from a user equipment (UE) and performs decoding operation to determine whether there is any error in the received data packet. If there is no error in the data packet (successfully decoded), Node B transmits an Acknowledgment (ACK) signal to the UE. On the other hand, if there is error in the data packet (unsuccessfully decoded), Node B transmits Negative Acknowledgment (NACK) signal to the UE. The UE then transmits a new data packet upon receipt of ACK or retransmits the same data packet upon receipt of NACK.

Another feature of the E-DCH relates to Node B determining statuses of UEs and scheduling transmission of data packets from a UE to Node B at every Transmit Time Interval (TTI). Through scheduling of data packet transmissions, uplink transmission capabilities of the E-DCH can be further enhanced from that of the DCH. It is important to note that Node B must have the status information of each UE in order to successfully execute scheduling operation. In practice, each UE can provide its information via a periodic transmission or non-periodically when significant change or update occurs to scheduling information.

For scheduling of data packet transmissions, Node B must have certain information, namely, a buffer status of each UE and transmission power status, among others. For example, as related to the buffer status, Node B has to have information on how much data is stored in the buffer as well as how much additional data can be stored in the buffer. As for the transmission power status, for example, Node B has to know the amount of transmission power remaining in the UE (or how much transmission power can be assigned to the E-DCH).

As is the operation in DCH, the E-DCH transmits data and format information separately. Here, control information is information regarding what method was used to format the E-DCH and how the formatted E-DCH was transmitted. The information is used to accurately decode the data. Examples of format information include an E-DCH Transport Format Combination Indicator (E-TFCI) which shows how the data is actually formatted, and a redundancy version for the HARQ and a sequence number.

In transmitting the control information, the transmission can easily contain transmission errors. The transmission errors include incorrectly determining occurrence of transmission when no transmission has been made, and vice versa, for example. Such transmission errors cause inefficiency to the operation of the resources in the wireless communication system. It is the objective of the present invention to introduce a more efficient means of encoding and transmitting of control signal, in turn reducing errors caused in transmission.

To combat errors occurring in transmission, a threshold detection method has been used. In the threshold detection method, an energy level of the corresponding interval is detected. From the detection, if it is determined that the energy level, which significantly exceeds the threshold level, has been transmitted, only then does Node B determine that a signal has been transmitted.

Unfortunately, this threshold detection method is not without errors. To put differently, even if a transmission has been completed, the method can incorrectly determine that the transmission has not been made. This incorrect determination could be a result of a very low energy level input from the transmitting end due to a low signal transmission affected by poor channel status. In addition, even if there is no transmission, the method can erroneously determine that a transmission has taken place as a result of large interference.

As one of possible solutions to errors in the threshold detection method, an error detection method can be employed. Generally, the error detection code is applied or attached to the short information. However, the short information combined with the error detection code has varying lengths.

A block code is advantageous is encoding short information. That is, the block code is good for encoding information being short in length. However, a problem with a block encoder is that the block encoder can only encode information bits having fixed lengths. In other words, the block encoder can only encode fixed number of information bits. Therefore, the block encode cannot encode a plurality of information bits having different lengths. In order to encode information bits having different lengths, independent block encoders which correspond to each different length is required. Here, each block encoder is only able to encode a short information bit having a specified length that corresponds to the length of the block encoder. Consequently, a number of block encoders that is able to encode short information bits having different lengths can be too numerous, resulting in ineffective and inefficient block encoders.

SUMMARY OF THE INVENTION

Accordingly, the present invention is directed to a method of formatting and encoding uplink short length data in a wireless communication system that substantially obviates one or more problems due to limitations and disadvantages of the related art.

An object of the present invention is to provide a method of encoding and transmitting at least one short length data in a wireless communication system.

Another object of the present invention is to provide a method of receiving and decoding at least one encoded short length data in a wireless communication system.

Another object of the present invention is to provide a method of encoding and transmitting at least one element information of control information in a wireless communication system.

Yet, another object of the present invention is to provide a method of receiving and decoding at least one encoded element information of control information in a wireless communication system.

Another object of the present invention is to provide a wireless communication system for encoding and transmitting at least one short length data.

Another object of the present invention is to provide a wireless communication system for receiving and decoding at least one encoded short length data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of encoding and transmitting at least one short length data in a wireless communication system includes a user equipment (UE) which attaches at least one error detection code to the at least one short length data. Thereafter, the UE encodes for error correction the short length data and the attached error detection code using at least one block encoder. Here the short length data and the attached error detection code are independently encoded. Lastly, the UE transmits the encoded short length data and the encoded error detection code.

In another aspect of the present invention, a base station (BS) receives the encoded short length data and the encoded error detection code. Here, the encoded short length data and the encoded error detection code are independently encoded for error correction using at least one block encoder, and the error detection code is attached to the short length data. Furthermore, the UE decodes the encoded short length data and the encoded error detection code.

In another aspect of the present invention, a user equipment (UE) attaches at least one error detection code to the at least one element information of the control information. Thereafter, the UE encodes for error correction the element information of the control information and the attached error detection code using at least one block encoder. Here, the element information and the attached error detection code are independently encoded. Lastly, the UE transmits the encoded element information and the encoded error detection code.

Yet in another aspect of the present invention, a base station (BS) receives the encoded element information and the encoded error detection code. Here, the encoded element information and the encoded error detection code are independently encoded for error correction using at least one block encoder, and the error detection code is attached to the element information. Furthermore, the BS decodes the encoded element information and the encoded error detection code.

In another aspect of the present invention, a wireless communication system for encoding and transmitting at least one short length data includes a user equipment (UE) which attaches at least one error detection code to the at least one short length data. Thereafter, the UE encodes for error correction the short length data and the attached error detection code using at least one block encoder. Here the short length data and the attached error detection code are independently encoded. Lastly, the UE transmits the encoded short length data and the encoded error detection code.

In another aspect of the present invention, a wireless communication system for receiving and decoding encoded control information includes a base station (BS) which receives the encoded short length data and the encoded error detection code. Here, the encoded short length data and the encoded error detection code are independently encoded for error correction using at least one block encoder, and the error detection code is attached to the short length data. Furthermore, the UE decodes the encoded short length data and the encoded error detection code.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A certain information and data are short in length. In transmitting such short length data (or information), errors could occur in the transmission stage. In fact, errors can take place regardless the length of the data. In order to deal with errors in transmission, an error detection code and an error correction code can be used. Moreover, a block encoder can be used to encode the data for error correction. As discussed above, the block encoder is suitable for encoding short length data. However, the block encoder has a fixed length for encoding. Therefore, a plurality of data each having different lengths cannot be encoded by one block encoder. Instead, a plurality of block encoders is needed to encode the plurality of data having varying lengths.

An example of short length data is control information. Hereafter, the embodiments of the present invention will be explained in detail using the control information. Furthermore, the short message data or the control information can be transmitted via an Enhanced Dedicated Channel (E-DCH) or other transmission channels. Although the embodiments of the present invention can be applied to various transmission channels, the following discussions will be based upon the E-DCH environment.

In the E-DCH, three types of information can be transmitted to Node B. They are E-DCH data, E-DCH format information, and scheduling information. The three types of information can be further categorized into data or format information. More specifically, the E-DCH data can be classified into a data category while the E-DCH format information and scheduling information can be classified into a non-data category.

Furthermore, the control information can be classified into two large categories. First category includes channel formation information, namely, the E-DCH format information, and the second category including scheduling information, namely, the E-DCH scheduling information for scheduling data transmission. The control information is transmitted via an independent channel, while the E-DCH format information and the scheduling information are transmitted via the same physical channel. For example, FIG. 1 illustrates an example of a structure of control information that can be transmitted using a time division method.

Figure 1:
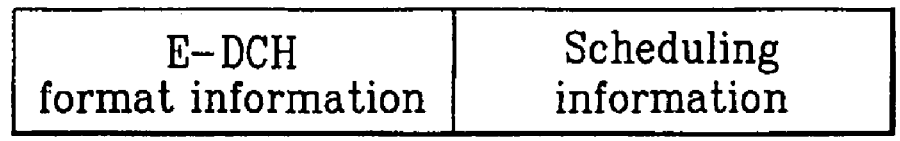
FIG. 1 illustrates an example of a structure of control information that can be transmitted.

In FIG. 1, the control information includes the E-DCH format information which is transmitted when the E-DCH data is transmitted, and the scheduling information which is transmitted independently of the E-DCH when Node B scheduler requires the scheduling information.

In transmission, the E-DCH format information and the scheduling information can be transmitted according to four different transmission scenarios as illustrated in FIGS. 2(a)-2(d).

In FIG. 2(a), the E-DCH format information and the scheduling information are both transmitted. In FIG. 2(b), only the E-DCH formation information is transmitted. In FIG. 2(c), only the scheduling information is transmitted. Lastly, in FIG. 2(d), neither the E-DCH format information nor the scheduling information is transmitted.

To minimize transmission error in transmitting the E-DCH data, an error detection code can be used to detect possible errors in transmission of the control information. More specifically, the E-DCH format information and the scheduling information can be encoded for error detection. As such, the error detection encoding can be used instead of the threshold detection method.

Figure 3:
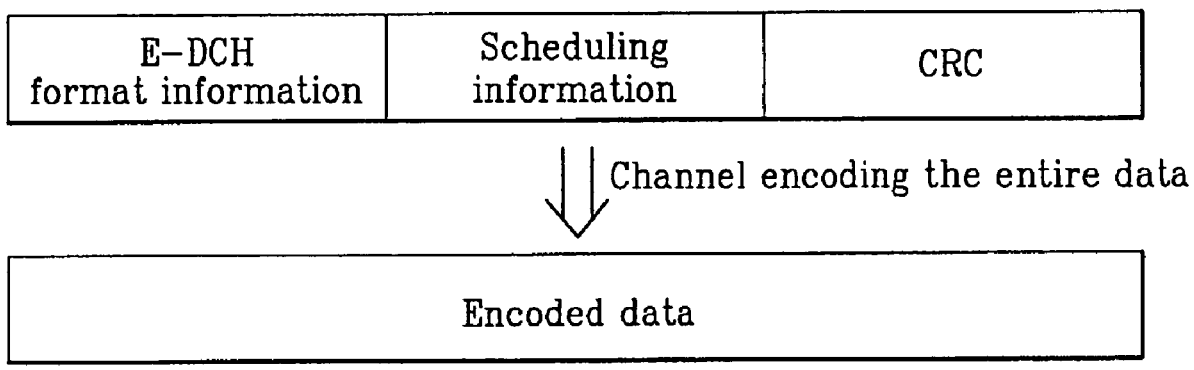
FIG. 3 illustrates an example of encoding the element information of the control information and the encoded element information for error detection.

FIG. 3 illustrates an example of encoding the element information of the control information and the encoded element information for error detection. In FIG. 3, the E-DCH control information and the scheduling information are referred to as data to be transmitted and the error detection code is referred to as a Cyclic Redundancy Check (CRC). The data to be transmitted and the error detection code are together encoded to make encoded data.

The operation of the receiving end (Node B) is as follows. Node B first can determine at every transmission whether the E-DCH format information and the scheduling information exist. In other words, if the E-DCH format information exists, Node B can determine what the E-DCH format information is and using the E-DCH format information, the E-DCH data can be decoded. In addition, Node B can determine what the scheduling information is after the scheduling information has been determined to exist, and then can use the information to schedule data transmission.

As previously discussed, Node B can determine whether the E-DCH format information and the scheduling information exist, and at the same time, whether an error exists. Furthermore, if an error detection encoding is provided to determine whether there is error in the transmission of the E-DCH format information and the scheduling information, it is possible to have a more efficient wireless mobile communication system, whereby the system can detect and filter out information with error(s). From a plurality of error detection encoding, a Cyclic Redundancy Check (CRC) will be hereinafter used as an example of error detection code to further explain the present embodiment.

Figure 2:
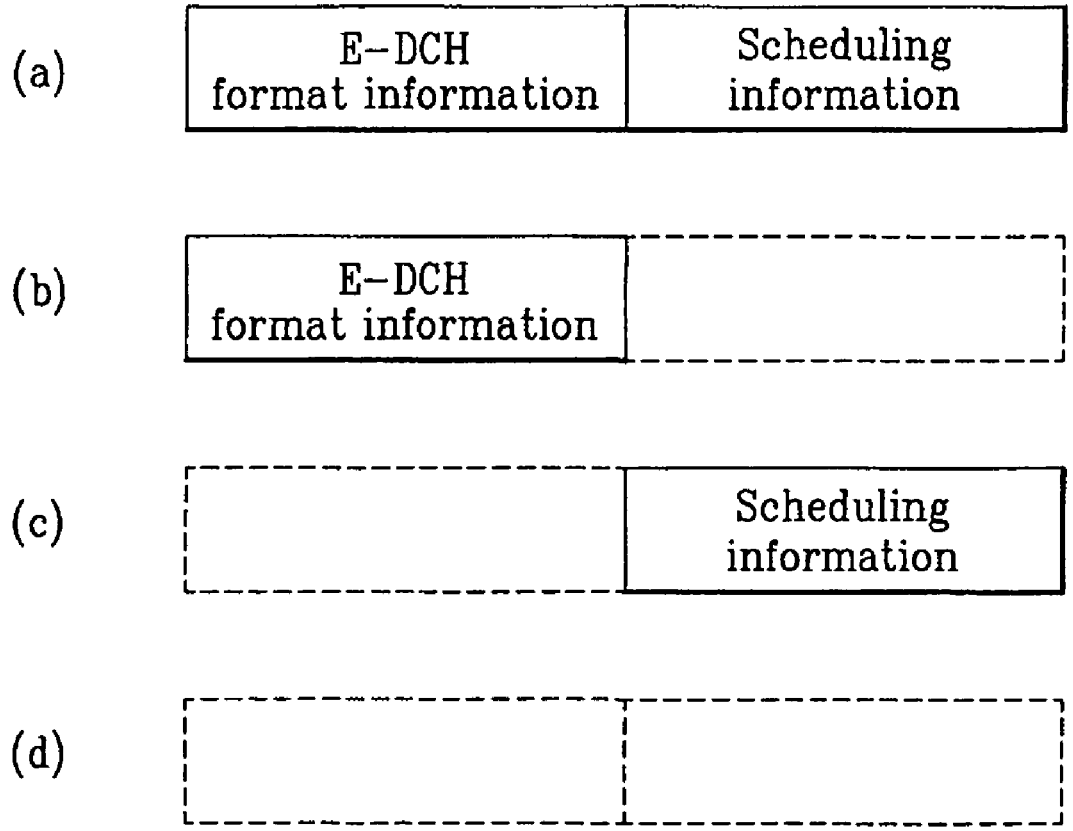
FIGS. 2(a)-2(d) are examples illustrating combinations of element information of the control information that can be transmitted.
Figure 4:
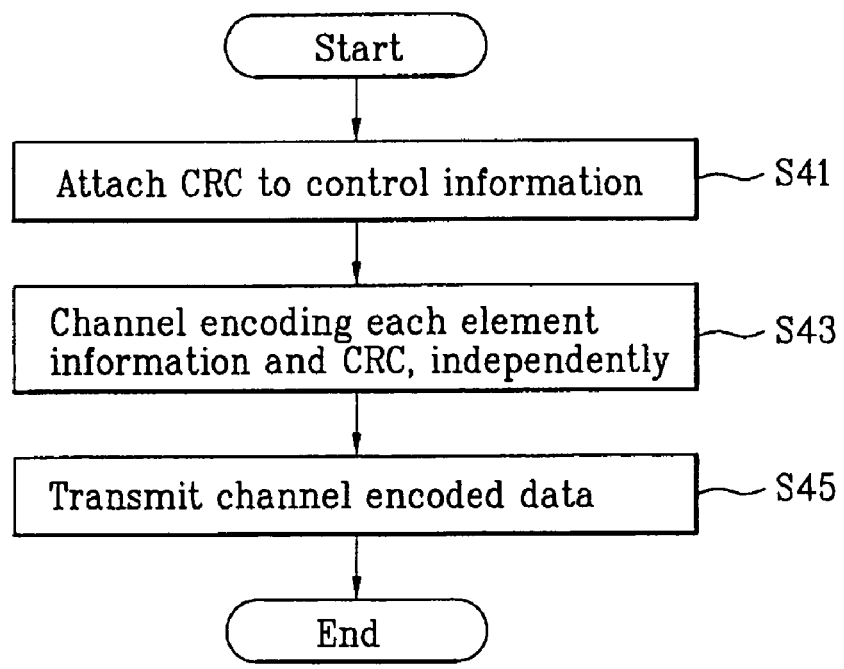
FIG. 4 illustrates a process of encoding for error correction control information and error detection encoded control information.

FIG. 4 illustrates a process of encoding for error correction control information and error detection encoded control information. A transmission using the E-DCH includes not only transmission of data traffic but also transmission of control information. Here, the control information is transmitted independently from the data traffic. Furthermore, the control information can include the E-DCH format information as well as scheduling information. As illustrated in FIG. 2, the control information can have the E-DCH format information and the scheduling information that are independently transmitted or that transmitted together. At the same time, neither the E-DCH format information nor the scheduling information has to be transmitted.

With respect to FIG. 4, an error detection code (or CRC) is attached to the control information to aid in detecting errors which occur during transmission (S41). In order to correct errors that can arise from being transmitted through a transmission channel, a Forward Error Correction (FEC) code can be used, for example. The transmitting end (UE) then performs channel encoding of at least one element information of control information, such as the E-DCH format information and the scheduling information, and to the CRC, independently (S43). Here, the CRC is attached to at least one element information. For example, the CRC can be attached to the E-DCH format information, to the scheduling information, or to both. Thereafter, the encoded element information and the encoded CRC can be transmitted (S45). As discussed above, the element information of the control information can be short in length in term of bits. Therefore, the short length data encompasses element information comprised of relatively small number of bits or being relatively short in length.

An error detection code (or CRC) can be attached to the element information of the control information. The following is an example of acquiring the error detection code to attach to the element information. For example, the element information is encoded for error detection, and then acquires the error detection code to attach to the element information. Thereafter, the element information and the error detection code is multiplexed, resulting in a block comprising the element information and the error detection code attached thereto. As previously discussed, the element information can be the E-DCH format information and/or the scheduling information while the error detection code can be the CRC.

FIGS. 5(a)-5(c) are examples illustrating at least one element information with CRC attached thereto. As illustrated in FIGS. 5(a)-5(c), there are many ways to attach or add the CRC to the control information. FIG. 5(a) is an example of attaching one CRC to the E-DCH format information and another CRC to the scheduling information. FIG. 5(b) is an example of attaching the CRC to the E-DCH format information only. FIG. 5(c) is an example of attaching the CRC to the scheduling information only. As such, it is possible to attach the CRC to any number of element information of the control information.

After the error detection code is attached to at least one element information of the control information, at least one element information and the attached error detection code(s) (or CRC) corresponding to each element information can be independently encoded for error correction before being transmitted. By encoding the element information and the attached error detection code, the receiving side can better decode the transmitted data and a more successful transmission can be achieved.

To perform the encoding operation, for example, an error correction code can be used. A Forward Error Correction (FEC) is an example the error correction code used for channel encoding.

As an example of the FEC code, block code can be used to perform channel encoding to data being short in length such as control information. Block code is appropriate for data being short in length. Block code formats data based on the length of the data. Examples of the block code include Hemming code, a Low Density Parity Check (LDPC) code, and a Transport Format Combination Indication (TFCI) code. However, due to the length limitation, a separate block encoder is needed to encode a plurality of data having different lengths. Accordingly, separate block decoders would be needed to decode each encoded data. Here, the data refers to the combination of the element information of the control information and the CRC attached thereto.

Alternatively, as another example of the FEC, Trellis code is available. Trellis code is generally suitable for encoding data having longer lengths but is not suitable for data having short lengths. In short, block code is appropriate for short length data whereas Trellis code is better suited to encode long length data. In the embodiments of the present invention, short length data is discussed.

Using block code to encode for error correction, for example, an independent or separate block encoders are necessary to encode data (i.e., control information and the attached error detection code) having different lengths. In block code, encoding is performed at blocks having specified lengths, and encoding does not depend or rely on another block and is independent from other blocks. An example of such encoding is a Reed-Solomon (RS) encoding used in a compact disc (CD) or digital broadcasting. Moreover, an example of encoding used in 3GPP is the TFCI code.

Furthermore, if the element information of the control information is encoded along with the attached CRC, an error correction encoder (e.g., block encoder) needed is not based on the length of the element information, but the length of the element information combined with the attached CRC.

As discussed above, separate block encoders would be necessary to encode the combined data, which includes the element information and the attached CRC. As a result, at least one block encoder would be necessary to encode the combined data having different lengths albeit short. However, instead of encoding the combined data (element information and the attached CRC), it is possible to independently encode each element information and the attached CRC. By independently encoding the element information and the attached CRC, encoding can be executed with one or a very few number of block encoders. Moreover, the block encoder can be repeatedly used to encode subsequent data.

Furthermore, if Node B does not require error detection of the attached CRC, the attached CRC would not be decoded. As a result, Node B can acquire the E-DCH format information (or channel format information) and the scheduling information faster and more efficiently since the attached CRC does not need to be decoded. Examples of independently encoding the element information of the control information and the attached error detection code (i.e., CRC) are illustrated in FIGS. 6(a)-6(c).

Figure 5:
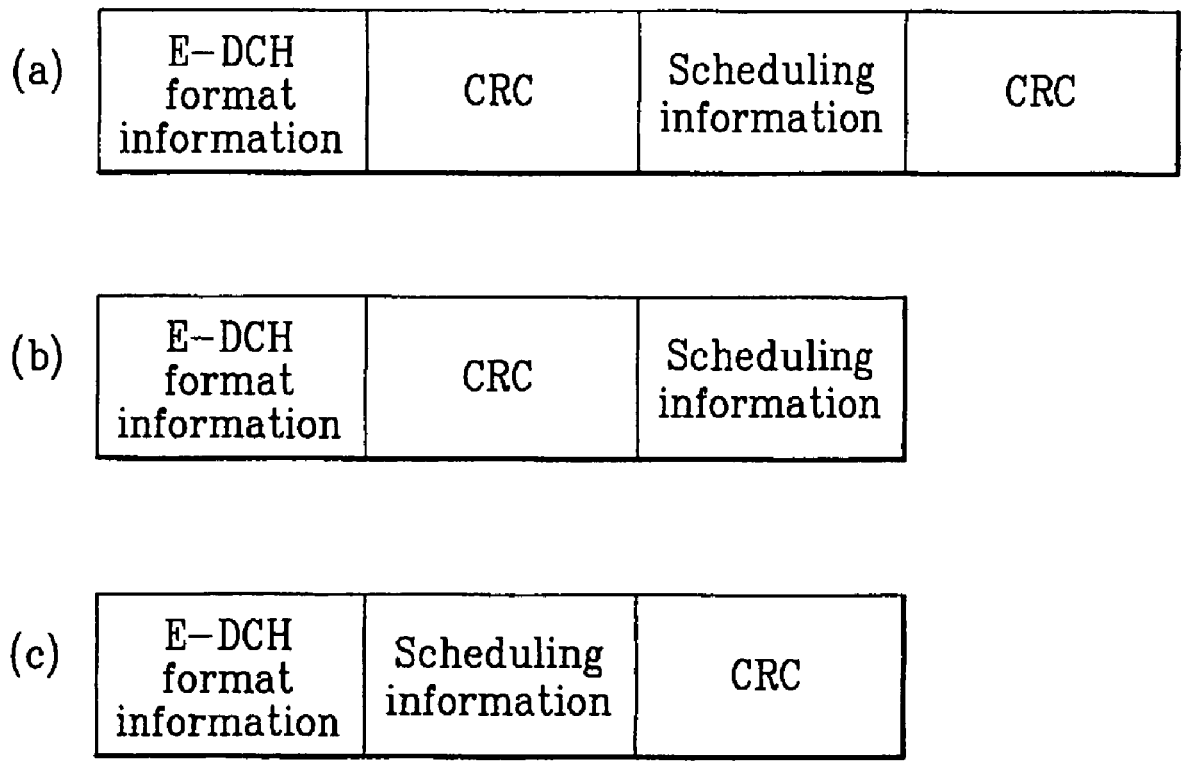
FIGS. 5(a)-5(c) are examples illustrating at least one element information with CRC attached thereto.
Figure 6:
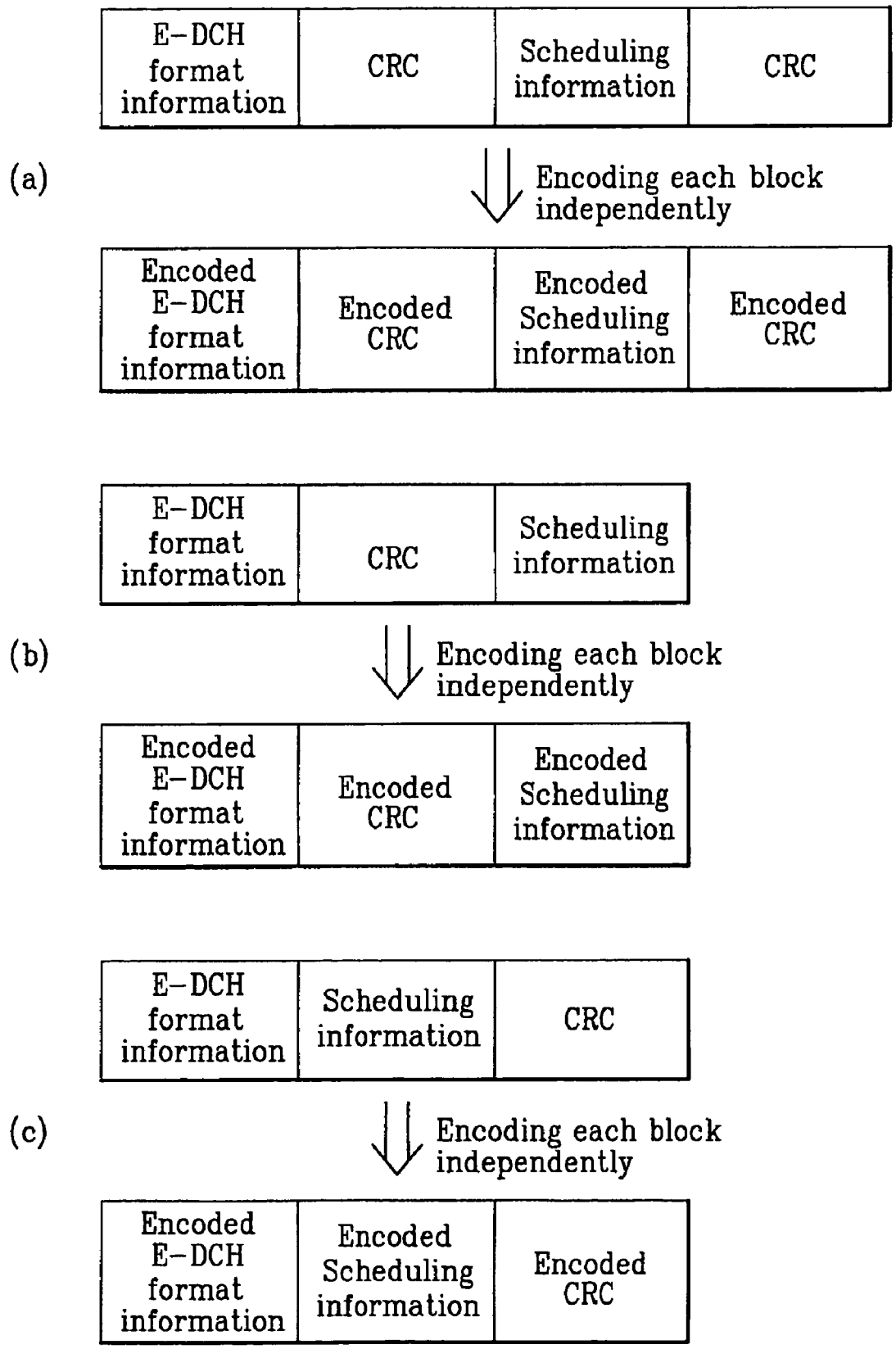
FIGS. 6(a)-6(c), which refer to FIG. 5, are examples which illustrate independent encoding each element information of the control information and the attached CRC.

FIGS. 6(a)-6(c), which refer to FIG. 5, are examples which illustrate independent encoding each element information of the control information and the attached CRC. The encoding operations in these figures do not encode the combined element information and the attached CRC as one data. Instead, encoding illustrated in these figures independently encode the element information and the attached CRC although they are combined.

FIG. 6(a) illustrates E-DCH format information with a CRC attached thereto, and scheduling information with a CRC attached thereto. In this figure, the blocks are encoded independently. That is, the E-DCH format information is encoded separately from the attached CRC, and at the same time, the scheduling information is separately encoded from the attached CRC as well as from the E-DCH format information and the attached CRC.

Similarly, FIG. 6(b) illustrates attaching the CRC only to the E-DCH format information and not to the scheduling information. Again, this figure further illustrates encoding the E-DCH format information, the CRC attached to the E-DCH format information, and the scheduling information. As discussed above, these block of information are independently encoded although they form transmission data.

Here, FIG. 6(c) illustrates attaching the CRC only to the scheduling information and not to the E-DCH format information. This figure further illustrates encoding the E-DCH format information, the scheduling information, and the CRC attached to the scheduling information, independently. Thereafter, the encoded data (the combined blocks) can be transmitted.

After the transmitting side (UE) independently encodes the element information of the control information along with the attached CRC and thereafter transmits the encoded data, the receiving side (Node B) can decode the received element information and the attached CRC.

In the discussion of above, channel format information and E-DCH format information was used interchangeably to refer to one of element information of control information. Because the transmission of data and/or control information can be transmitted via the E-DCH or other transmission channels, these two terms were used interchangeably.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of encoding and transmitting short length data at a transmitting end in a wireless communication system, the method comprising:
providing the short length data including an information element and an error detection code;
encoding the information element using a block encoder comprising a first size to generate an encoded information element;
encoding the error detection code using a block encoder comprising a second size to generate an encoded error detection code; and
transmitting encoded short length data comprising the encoded information element and the encoded error detection code to a receiving end,
wherein the first size is different from the second size.

2. The method of claim 1, wherein the error detection code is a cyclic redundancy check (CRC).

3. The method of claim 1, wherein the information element includes control information.

4. The method of claim 3, wherein the control information includes channel format information.

5. The method of claim 3, wherein the control information includes channel format information of an Enhanced Dedicated Channel (E-DCH).

6. The method of claim 3, wherein the control information includes scheduling information.

7. The method of claim 3, wherein the control information includes scheduling information of an Enhanced Dedicated Channel (E-DCH).

8. The method of claim 3, wherein the control information includes channel format information and scheduling information.

9. The method of claim 3, wherein the control information includes channel format information of an Enhanced Dedicated Channel (E-DCH) and scheduling information.

10. The method of claim 1, wherein the encoded short length data is transmitted via an Enhanced Dedicated Channel (E-DCH).

11. A method of receiving and decoding encoded short length data at a receiving end in a wireless communication system, the method comprising:
receiving the encoded short length data from a transmitting end, wherein the encoded short length data includes an encoded information element and an encoded error detection code;
decoding the encoded information element using a block decoder comprising a first size; and
decoding the encoded error detection code using a block decoder comprising a second size,
wherein the first size is different from the second size.

12. The method of claim 11, wherein the error detection code is a cyclic redundancy check (CRC).

13. The method of claim 11, wherein the information element includes control information.

14. The method of claim 13, wherein the control information includes channel format information.

15. The method of claim 13, wherein the control information includes channel format information of an Enhanced Dedicated Channel (E-DCH).

16. The method of claim 13, wherein the control information includes scheduling information.

17. The method of claim 13, wherein the control information includes scheduling information of an Enhanced Dedicated Channel (E-DCH).

18. The method of claim 13, wherein the control information includes channel format information and scheduling information.

19. The method of claim 13, wherein the control information includes channel format information of an Enhanced Dedicated Channel (E-DCH) and scheduling information.

20. The method of claim 11, wherein the encoded short length data is transmitted via an Enhanced Dedicated Channel (E-DCH).

21. A user equipment of a wireless communication system for encoding and transmitting short length data, the user equipment configured for:
attaching an error detection code to an information element to form the short length data;
encoding the information element using a block encoder comprising a first size to generate an encoded information element;
encoding the error detection code using a block encoder comprising a second size to generate an encoded error detection code; and
transmitting encoded short length data comprising the encoded information element and the encoded error detection code to a base station,
wherein the first size is different from the second size.

22. A base station of a wireless communication system for receiving and decoding encoded short length data, the base station configured for:
receiving the encoded short length data, wherein the encoded short length data includes an encoded information element and an encoded error detection code;
decoding the encoded information element using a block decoder comprising a first size; and
decoding the encoded error detection code using a block decoder comprising a second size,
wherein the first size is different from the second size.

\* \* \* \* \*